United States Patent
Jantos

(10) Patent No.: US 7,800,015 B2
(45) Date of Patent: Sep. 21, 2010

(54) LASER INSCRIBING STATION FOR CREDIT CARDS

(75) Inventor: Heinrich Jantos, Paderborn (DE)

(73) Assignee: Böwe Cardtec GmbH, Paderborn (DE)

( * ) Notice: Subject to any disclaimer, the term of this patent is extended or adjusted under 35 U.S.C. 154(b) by 1084 days.

(21) Appl. No.: 10/553,961

(22) PCT Filed: Apr. 16, 2004

(86) PCT No.: PCT/EP2004/004025

§ 371 (c)(1),
(2), (4) Date: Aug. 3, 2006

(87) PCT Pub. No.: WO2004/095381

PCT Pub. Date: Nov. 4, 2004

(65) Prior Publication Data

US 2007/0051583 A1    Mar. 8, 2007

(30) Foreign Application Priority Data

Apr. 19, 2003   (DE) ................. 103 17 984

(51) Int. Cl.
*B23K 26/00* (2006.01)
*B65G 43/08* (2006.01)
*B65H 9/00* (2006.01)

(52) U.S. Cl. ............... 219/121.68; 198/464.1; 271/226

(58) Field of Classification Search . 219/121.6–121.86; 400/521–544; 271/226–228, 232–255; 198/345.1–345.3, 198/464.1, 464.2
See application file for complete search history.

(56) References Cited

U.S. PATENT DOCUMENTS

| 4,492,297 | A | * | 1/1985 | Sticht | 198/345.3 |
| 5,558,449 | A | * | 9/1996 | Morgavi | 400/188 |
| 5,771,058 | A | | 6/1998 | Kobayashi | |
| 6,279,901 | B1 | | 8/2001 | Fulmer | |
| 6,318,914 | B1 | * | 11/2001 | Cuo et al. | 400/188 |
| 7,032,304 | B2 | * | 4/2006 | Gieskes | 29/832 |

FOREIGN PATENT DOCUMENTS

| DE | 101 47 037 A1 | 4/2003 |
| EP | 1 033 671 A1 | 9/2000 |
| FR | 2 822 142 A | 9/2002 |

* cited by examiner

*Primary Examiner*—Sang Y Paik
(74) *Attorney, Agent, or Firm*—Browdy and Neimark, PLLC

(57) ABSTRACT

A laser inscribing station controls the inscribing position (BP) of a laser beam in terms of two coordinates, one pair of feed and pressure rollers is disposed on both the infeed side and the outfeed side of the station. The credit card is positioned aligned in parallel lateral guide tracks, which are disposed in a turning mechanism together with a transfer conveyor, which displaces the credit card to such an extent that it is inserted in a first transfer position from the pair of infeed rollers into the guide tracks. In a second transfer position, the credit card is is held between the rollers pairs in such a manner that its entire surface is freely accessible for laser inscription. In a third transfer position, the card can be seized by the pair of outfeed rollers.

12 Claims, 2 Drawing Sheets

LASER INSCRIBING STATION FOR CREDIT CARDS

BACKGROUND OF THE INVENTION

The invention relates to a device for transporting credit cards into an inscribing position of a laser beam that is controlled in terms of two coordinates and its intensity, wherein one photoelectric barrier-controlled driven pair of transport and pressure rollers is disposed in each case on the infeed side and outfeed side and the credit card is aligned properly positioned for inscribing in each case in parallel lateral guide tracks.

It is known to mark credit cards with characters, pictures, symbols, etc., using a raster-guided laser burner with the card being situated in an inscribing position in the beam path of the laser.

The card is usually fed, in a continuous operation driven by means of photoelectric barrier-controlled roller pairs, to multiple processing steps in succession. If the card is to be lasered on both sides, one of the stations is a turning station through which the card passes step by step. The conveyance by means of rollers has the shortcoming that the rollers partly cover the card surface to be inscribed, so that a position change must be carried out if the entire card surface is to be lasered continuously. The turning station also requires additional space, which corresponds to at least one card length, and additional card travel times are accordingly added to the actual turning process.

It is the object of the invention to create a shorter, faster and more precisely operating simpler laser inscribing station.

SUMMARY OF THE INVENTION

This object is met in such a way that the guide tracks are disposed in a turning means, which is disposed between the roller pairs together with a transfer conveyor whereby the credit card is displaceable between the roller pairs to such an extent that is inserted in a first transfer position from the infeed roller pair into the guide tracks, is situated retained only at its edges in a second transfer position between the roller pairs with its entire surface freely accessible for laser inscribing, and can be seized in a third transfer position by the pair of outfeed rollers.

Advantageous embodiments are specified in the subclaims.

In a first embodiment, which is shown in detail, the turning means is mounted on the transfer means so as to move integrally with the same. In a second embodiment both the turning means as well as the transfer means are mounted with stationary bases so that the transfer means displaces the card by retaining it symmetrically by means of a gripper or cams between the two guide means, but is not located in the optical field during the lasering process and located outside of the turning range during the turning process. A very simple device of the latter type uses a pusher which, similar to the credit card, is pushed forward and pulled back actuated by the roller drive of the infeed rollers.

While the card is being fed in, the pusher is moved out of the roller pair in a deflected manner, and advanced inwardly deflected following the rear edge of the card.

The first embodiment of the device incorporates a cage on whose spaced-apart side plates the guide tracks are mounted, which consist of tracks in a short-sided U-shape wherein the spacing of the sides is slightly wider than the standardized card thickness of 0.8 cm, so that the card situated between them is positioned flat and unambiguous relative to the laser device, and uninscribable strips of only a few millimeters' width remain along the edges.

The side plates have recesses so that the shafts of the infeed and outfeed rollers can enter there when the card is retrieved or fed in.

The cage is connected to the shaft of a turning mechanism that crosses the guide tracks in the center. The turning mechanism and its turning drive motor are mounted on the cradle of the transfer means. The cradle is mounted displaceable on the cradle track and connected to a drive belt, which is held on one side by a step motor and on the other side by a deflection roller.

The motors are step motors and are actuated in steps, with the start positions being signaled in each case to the control unit by position indicators. Added to this is the processing of the photoelectric-barrier signals that are triggered by the front and rear credit card edges, so that the three individual positions and the turning process are actuated in combination with the laser device in the proper sequence.

The transfer roller and the receiving roller of the roller pairs are advantageously made of an elastic toothed material, so that the end of the card or beginning of the card is in a released state without seizing as long as the transfer drive is moving the card, and the roller drives otherwise firmly and securely engage on the card.

BRIEF DESCRIPTION OF THE DRAWINGS

Advantageous embodiments are depicted in FIGS. 1 and 2.

DETAILED DESCRIPTION OF THE INVENTION

Figure 1:
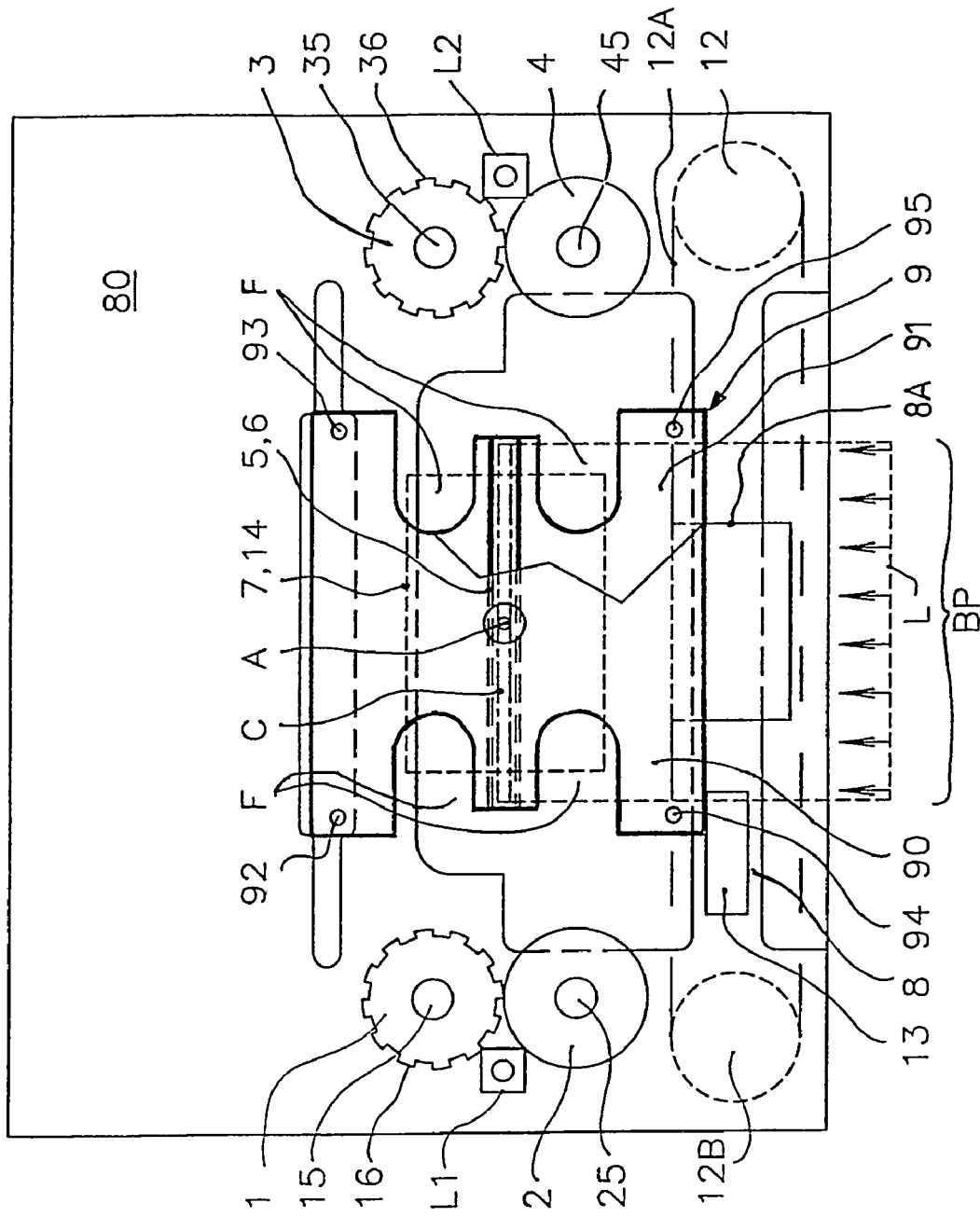
FIG. 1 shows a side view schematically partially opened.

FIG. 1 shows a mounting wall 80, which is usually positioned vertically, with a pair of infeed rollers 1, 2 and a pair of outfeed rollers 3, 4, on both sides of a cage 9, which is shown partially opened. It consists of a front and rear plate 90, 91, which are held parallel to one another by means of spacers 92-95 in such a way that a credit card C, which is symbolized by a dot-and-dash line, is held displaceably between them in U-shaped horizontally arranged guide tracks 5, 6.

The plates 90, 91 have clearance areas F on both sides that permit a displacement of the cage 9 with its guide tracks 5, 6 until it reaches one or the other pair of rollers, their shafts 15, 25, 35, 40 extending through the clearance areas F. To this effect, the cage 9 is disposed by means of a turning mechanism on a cradle 8A, which is mounted displaceably on a cradle track 8, which is visible at the bottom, and connected in terms of a drive to a cradle drive 12. The cradle drive 12 consists of a step motor, which drives a toothed belt 12A, which is guided over a deflecting wheel 12B at the other end of the cradle track 8. A position indicator 13 signals a cradle start position.

Three transfer positions are provided for the cradle and turning means 7.

In the first position the cage 9 is positioned far enough to the left so that a credit card being transported through the pair of infeed rollers 1, 2 is deposited centered in the guide tracks 5, 6. The upper transport roller 1 is driven and has on its circumference an elastic toothing 16 parallel to its axis so that the card exits the rollers 1, 2 in a defined position.

In the second position, the inscribing position BP, which is depicted, the credit card C is located with its entire surface outside of the rollers 1-4, so that the schematically indicated laser scan area covers the entire card.

After lasering one side of the card, the turning means 7 pivots the cage 9 with the credit card C about its center axis A, which crosses the guide tracks 5, 6. Then a second lasering begins. An additional transfer subsequently takes place into the third position, in which the credit card C engages into the outfeed roller pair 3, 4. It, too, has a drive roller 3 on top with an elastic toothing 36 that guarantees a precise card transfer. The counter-pressure rollers 2, 4 of the roller pairs are made of a smooth plastic.

Photoelectric barriers L1, L2 at the roller pairs 1, 2; 3, 4 control the roller advancement in each case as long as the card C is located in-between.

Figure 2:
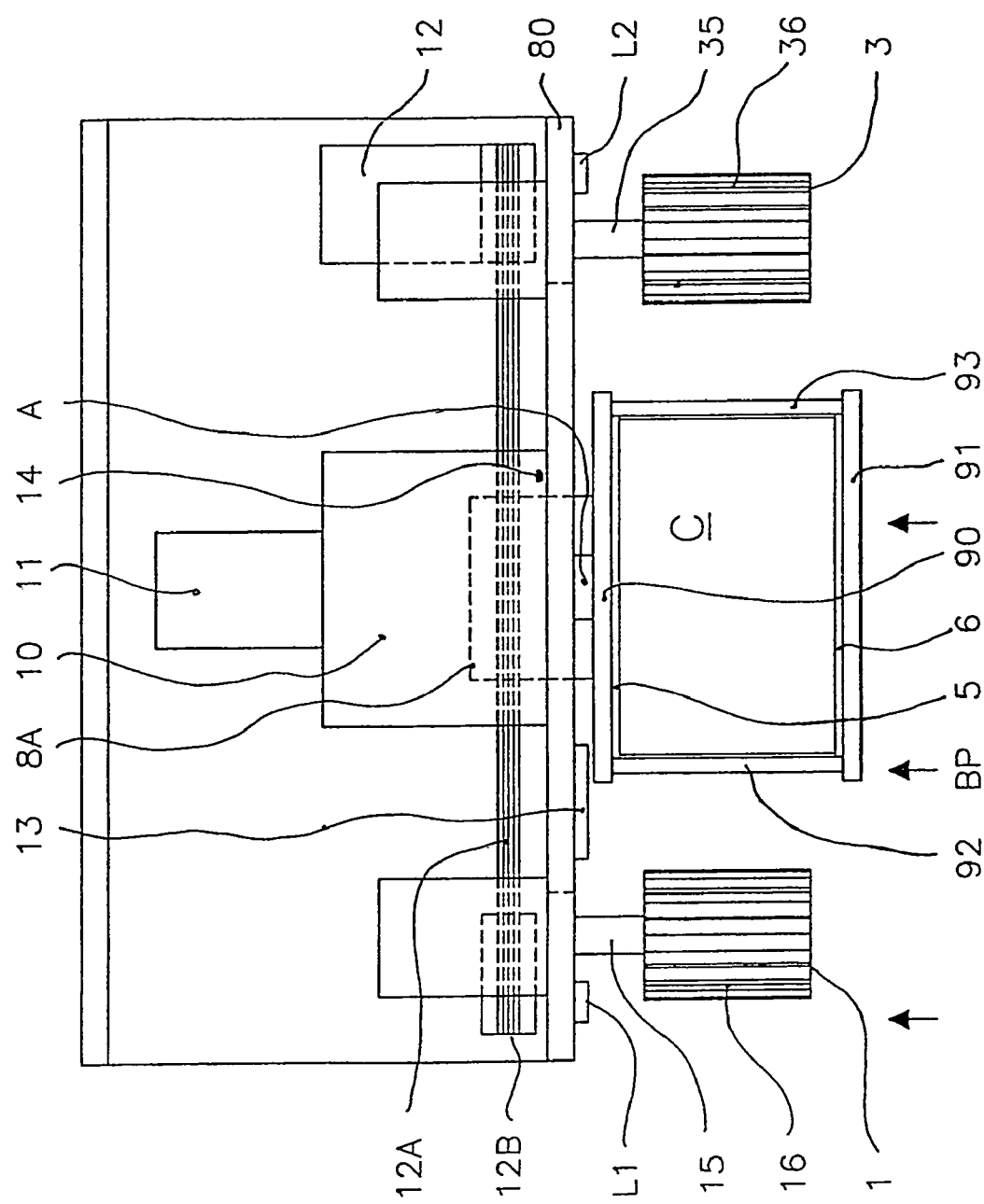
FIG. 2 shows a top view schematically partially opened.

FIG. 2 shows a top view of FIG. 1. One can additionally see the turning means 7, which is arranged partly behind the mounting wall 80 and whose axis A extends through the mounting wall 80 in a horizontal slit. The axis A is situated in a turning mechanism 10, which is actuated by means of a turning drive 11, which is a step motor. A position indicator 14 signals the start position of the cage 9, in which the guide tracks 5, 6 are aligned between the gaps of the roller pairs 1, 2; 3, 4.

The entire device has a relatively short overall length. The spacers 92-95 are situated in front of and behind the surface of the card, in order for the laser field to be free. It must be possible for the spacers to be rotated past the drive roller pairs 1, 2; 3, 4 when the cage is in motion, which establishes the minimum distance of the roller pairs. The card movements during the transfer and during the turning process are only in one direction in each case, however, the turning means must be moved back by the transfer path of the card before it receives a new card. This transfer path results from the minimum spacing of the roller pairs minus the card length; it is shorter than the latter, as shown by the example.

LIST OF REFERENCE NUMERALS

1 Infeed drive roller
2 Infeed pressure roller
3 Outfeed drive roller
4 Outfeed pressure roller
5 $1^{st}$ guide track of the card
6 $2^{nd}$ guide track of the card
7 Turning means
8 Cradle track—transfer conveyor
8A Cradle
9 Cage
10 Turning mechanism
11 Turning drive
12 Cradle drive
12A Toothed belt
12B Deflecting wheel
13 Position indicator—cradle
14 Position indicator—turning means
15, 25, 35, 35 Shafts of 1, 2, 3, 4
16 Toothing in 1
36 Toothing in 3
80 Mounting wall
90 Plates of the cage 9
91 Plates
92-95 Spacer of 9
A Axis of the turning means
BP Inscribing position
C Credit card
F Clearance areas in 90, 91
L1 Photoelectric barriers
L2 Photoelectric barriers
L Laser scan area

What is claimed is:

1. An inscribing position (BP) of a laser beam that is controlled in terms of two coordinates and its intensity, wherein one photoelectric barrier-controlled driven pair of transport and pressure rollers (1, 2; 3, 4) is disposed in each case on the infeed side and outfeed side, and the credit card (C) is properly positioned for inscribing in each case aligned in parallel lateral guide tracks (5, 6), characterized in that the guide tracks (5, 6) are disposed in a turning means (7), which is disposed between the roller pairs (1, 2; 3, 4) together with a transfer conveyor (8, 12) whereby the credit card (C) is displaceable between the roller pairs (1, 2; 3, 4) to such an extent that it is inserted in a first transfer position from the pair of infeed rollers (1, 2) into the guide tracks, is situated retained only at its edges in a second transfer position between the roller pairs (1, 2; 3, 4) with its entire surface freely accessible for laser inscribing, and can be seized in a third transfer position by the pair of outfeed rollers (3, 4).

2. A device according to claim 1, characterized in that the turning means (7) is disposed on the transfer conveyor (8, 12), which is a cradle (8A) on a cradle track (8), which is connected to the cradle drive (12).

3. A device according to claim 1, characterized in that the turning means (7) and the transfer means are mounted stationary and the transfer means in each case symmetrically positions the credit card (C) between the guide tracks (5, 6) by means of a gripper and releases it during turning of the turning means (7).

4. A device according to claim 3, characterized in that the gripper is coupleable in terms of a drive to the infeed drive rollers (1, 2).

5. A device according to claim 2, characterized in that the guide tracks (5, 6) are situated in a cage (9), which is mounted on a rotational axis (A) of a turning mechanism (10), which is supported with a motor-driven turning drive (11) on the cradle track (8), and that the rotational axis (A) in its extension crosses the two guide tracks (5, 6) in each case approximately in the center.

6. A device according to claim 1, characterized in that the guide tracks (5, 6) are low U-shaped sections whose width corresponds in a loose fit to the standardized card thickness.

7. A device according to claim 1, characterized in that the guide tracks (5, 6) are disposed in each case on plates (90, 91), which are held at a parallel distance from one another by means of spacers (92-95), and clearance areas (F) are left in each case adjacent to the guide tracks (5, 6) for drive shafts (15, 25; 35, 45) of the roller pairs (1, 2; 3, 4) to pass through.

8. A device according to claim 2, characterized in that a cradle drive (12) of the cradle (8A) contains a step motor that actuate in each case in a correct sequence the three transfer positions and a turning drive (11) of the turning means (7) contains a further step motor that actuate in a correct sequence two turning positions of the credit card (C) in a step-by-step manner relative to reference positions being signaled by position indicators (13, 14).

9. A device according to claim 1, characterized in that the drive rollers (1, 3) in each case have a toothing (16, 36) of an elastic material.

10. A device according to claim 8, characterized in that the pairs of rollers (1, 2; 3, 4) and the cradle track (8) are mounted on a vertically positioned mounting wall (80) together with roller drives, photoelectric barriers (L1, L2) and position indicators (13, 14), as well as the cradle drive (12).

11. A device according to claim 10, characterized in that the cradle drive (12) consists of a step motor and a deflected toothed belt.

12. A device according to claim 8, characterized in that the drive motors of the drive rollers (1, 3) the turning drive (11) and the cradle drive (12) are operated via a control means that report in each case the reaching of an inscribing position (BP) and of the two turning positions to a laser inscribing control unit and process a completion signal coming from same.

* * * * *